2,893,891
Patented July 7, 1959

2,893,891

HIGH SURFACE AREA COATING PRODUCTION

Samuel W. Bradstreet and James S. Griffith, Chicago, Ill., assignors to Armour Research Foundation of Illinois Institute of Technology, Chicago, Ill., a corporation of Illinois No Drawing. Application May 19, 1954
Serial No. 431,004

1 Claim. (Cl. 117—62)

The present invention relates to a novel coating method and the product resulting therefrom, and more particularly, to a novel method of obtaining a coating which has extremely high surface area by virtue of its porosity and to an improved article coated with a porous film having extremely high surface area.

This application is a continuation in part of our copending application, Serial No. 338,585, filed February 24, 1953, now U.S. Patent No. 2,763,569.

In a number of fields, and particularly in fields involving a gas-solids reaction, it is desirable to prepare the solids in a form so as to have maximum surface area. In the catalysis of gas phase reactions, it is particularly desirable to have a solid catalyst therefor which has a large surface area. Also, in the case of such reactions wherein a gas reacts with a solid, such as in the reduction of a metal oxide to a metal in the presence of a reducing gas atmosphere, it is particularly desirable to have the solid metal oxide in a form which presents a maximum surface area. Maximum porosity, which is another way of referring to maximum surface area, is also desired in a number of other uses, which include those of providing a protective covering for a catalyst to be used in a gaseous or liquid reaction. Such a porous protective coating permits the reaction to take place catalyzed by the catalyst, but it prevents loss of the catalyst or the production of catalyst fines, caused by the catalyst particles being separated from the carrier.

It is a further problem in the art to obtain a porous metallic coating for a given surface.

The instant invention is based primarily on the discovery that a uniquely porous or maximum surface area coating for a given backing member may be obtained by applying a crypto-crystalline metal oxide coating thereto. This crypto-crystalline metal oxide coating has extremely high surface area so that it may be used as such to catalyze certain reactions, or it may be reduced by exposure to gaseous atmosphere to a metal coating, which in turn may be used as a catalyst because of its high surface area. Additionally, the instant crypto-crystalline coatings have sufficient porosity and adherence to permit their use as a protective coating for a surface coated catalyst carrier.

It is, therefore, an important object of the instant invention to provide an improved method of preparing a high surface area coating and an improved method of carrying out fluid-solids reactions employing such coating.

It is a further object of the instant invention to provide an improved method of depositing finely divided particulate noble metals onto a suitable backing member, and to carry out reactions employing such deposited noble metals, and to provide surfaces coated with the noble metal coatings.

Other and further objects, features and advantages of the present invention will become apparent to those skilled in the art from the following detailed disclosure of preferred embodiments thereof.

One aspect of the present invention consists in an improved method of carrying out a reaction which is catalyzed by a given metal oxide, which comprises applying an adherent thin crypto-crystalline coating of the metal oxide to a catalyst carrier and then carrying out the reaction in the presence of said coating.

For example, an aluminum nitrate (4% alumina content) in anhydrous ethanol has been found to give typical results in the practice of the invention. This solution is sprayed onto a plurality of Pyrex glass beads (5 mm. in diameter) with the beads heated to a temperature of about 600° F. (400 to 1200° F. being operative) at a rate sufficiently rapid to cause the alumina particles to impinge against and adhere to the surface of the beads. Alumina contents of about 0.1–10 or 12% may be used successfully, but about 1–5% is preferred.

If aqueous aluminum nitrate solutions are used, the preferred temperatures are about 600–1200° F. In general, temperatures for all aluminum salts (including ammonium aluminum carbonate) should be a little higher than those used for some of the other salt solutions because alumina has a greater tendency toward solvation (i.e. hydration) and operating temperatures should be used which clearly effect "unsolvation" of alumina. Soluble aluminum acetate may be used under substantially the conditions described for aluminum nitrate with comparable results.

Similar results may be obtained using compounds of the other metals of group III–B (i.e. Ga, In and Tl) such as $Tl(NO_3)_3 \cdot 3H_2O$, $Ga(NO_3)_3 \cdot xH_2O$, and $In(NO_3)_3 \cdot 3H_2O$, which decompose thermally to yield the corresponding metal oxide ($Tl_2O_3$, $Ga_2O_3$ and $In_2O_3$, respectively), using spraying temperatures of about 400–1200° F., and preferably about 600–1000° F. and metal oxide concentrations in aqueous solutions of 1–10% and preferably 2–6 (wt.) percent.

In the case of each of these compounds above described, the steps of the spraying procedure are substantially the same, and they involve first providing a solution of a volatile solvent of a metal compound that is thermally decomposable to yield a non-volatile metal oxide, next atomizing the solution, then directing the atomized solution against a surface which is hot enough to thermally decompose the compound and release discrete metal oxide particles which contact and adhere to the surface and which is also hot enough to volatilize the remaining volatile components within the time period from just prior to contact between the particles on the surface to substantially the instant of contact between the particles and the surface. This involves operation of the spraying in accordance with observed results. If the spraying is too fast or too heavy, wet spots appear on the surface being coated and blisters and similar imperfections will result at these locations. If the spraying is too slow, the metal oxide particles appear to form agglomerates which bounce off the surface being coated as sand-like particles, instead of adhering. If, however, the rate of spraying is correlated with the temperature of the surface so as to fall between the two extremes, a uniform thin metal oxide coating adheres tenaciously to the surface.

The mechanics and theoretical considerations believed to be involved in the foregoing reaction, as well as the various reaction conditions, etc., are set forth in greater detail in our application Serial No. 338,585, filed February 24, 1953, now Patent No. 2,763,569, entitled "Spraying Process and Products" which disclosure is incorporated herein by reference and made a part hereof. The invention described and claimed in application Serial No. 338,585, now Patent No. 2,763,569, relates to the coating process per se and surfaces generally coated with the instant crypto-crystalline layer.

In general, it is understood that the metal oxide is present in solution, i.e., the alumina, in a form such that the metal atom is substantially unsolvated, or at least weakly solvated, in the solvent system. It is believed that the decomposition of the nitrate salt takes place immediately prior to or at the very instant of contact with the heated metal or glass surface, so that molecular size alumina particles are instantly released from what constituted a solution thereof. Such molecular size alumina particles are thus impinged upon the surface and adhere thereto by virtue of the physical phenomena such as intermolecular attraction, as contrasted to a true chemical bond and also as contrasted to the formation of a fused coherent or integrated layer of alumina adhering to the surface by virtue of its own integration. The alumina on the surface is in the form of extremely minute crystals or crystallites which recent methods of analysis indicate are in the neighborhood of 50–200 A.; and such analyses clearly indicate that these crystallites have sizes that are not greater than the wavelength of visible light (i.e., 2000–3000 A.).

Such a condition is known as "crypto-crystalline," in that the alumina is truly crystalline with irregularities therein being in form (not valence, as in the case of amorphous materials). The alumina film is flexible and coatings applied to sheet metal, by a procedure similar to the above described, adhere firmly without cracking, etc. when the metal is folded over or if the metal is heated and then quenched. For the purposes of the instant invention, a particularly advantageous aspect of the instant coatings is that these crypto-crystalline coatings are porous. This has been established in a number of ways; and it has further been established that the porosity of these coatings is particularly fine, although water and the usual small size gas molecules or ions are capable of penetrating the coatings of the invention. The extremely fine particle size here involved and the fine porosity provide an immense surface area in these coatings. For example, the alumina coating applied, in accordance with the foregoing demonstration, is applied to the extent sufficient to provide a coating of 0.5199 gram per 100 grams of glass beads, thereby indicating the extremely fine coating is applied. The surface area of the coating in square meters per gram of coating (determined by the Brunauer-Emmett-Teller procedure) based on the coating is 9.99.

One use for the high surface area coatings here obtained is in catalysis of fluid or gas phase reactions. For example, the alumina coated Pyrex glass beads just described show a distinct tendency to effect dehydration of ethyl alcohol in accordance with the well known reaction indicated by the following Equation 1:

(1) 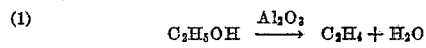
$$C_2H_5OH \xrightarrow{Al_2O_3} C_2H_4 + H_2O$$

The various metal oxides are known as catalysts for a number of specific reactions involving fluid phase reactants; and the instant invention affords a unique advantage in that it provides for the application of a specific metal oxide as an extremely fine thin coating (thereby saving material) which has an extremely high surface area (thereby facilitating the catalytic function).

The technique for applying these coatings in each case is substantially that hereinbefore described. Some metal oxides require slightly higher temperatures than others in order to effectively remove the solvent or effect "unsolvation," but the technique of application is that just described. In particular, the nitrates of a number of metals have been found to be most satisfactory for the deposition of the metal oxides therefrom in accordance with the practice of the instant invention. Various amines may be used and also various salts of organic acids such as the acetates may be used. In general, the compound which may be used is a compound soluble in the solvent medium (which is preferably water), which contains the metal atom and no other atoms other than carbon, hydrogen, oxygen and nitrogen. Although there may be exceptions in the case of certain metals, whereby a greater variety of compounds of these metals may be used, it has been found that solutions of a solid oxide forming metal, which is in solution in the form of a compound of this metal with no other atoms in the molecule except oxygen, carbon, nitrogen and hydrogen are effective in the practice of the instant invention. The solutions must, of course, have an appreciable concentration (i.e., the compounds themselves must be appreciably soluble in the solutions, so as to exclude a pure carbonate salt but permit the use of ammonium carbonate complexes such as ammonium zirconyl carbonate). It will also be noted that all of such compounds are heat decomposable at the operating temperature. Such compounds also contain oxygen and preferably nitrogen; and if carbon is present in such compounds, then nitrogen and/or hydrogen are also present with the oxygen.

As previously mentioned, however, the nitrates are most preferably used in the case of the greater number of metals. The nitrates which may be used include those of the metals of groups I–B (Cu); II–A (Mg, Ca, Ba and Sr); II–B (Zn and Cd); III–A (Sc, Y and La); III–B (Al, Ga, In and Te); IV–A (Ti, Zr and Hf); IV–B (Si, Pb and Sn); VI–A (Cr, Mo and W); VII–A (Mn); VIII (Fe, Co, Ni, Ru, Rh, Pd, Os, Ir); and the rare earth metals (Ce, Pr, Nd, Sm, En, Gd, Dy, Ho, Er, Tm, Yb, Th). The noble metals form a deposit not identified as the oxide thereof. The ammonium carbonate salts which may be used include Mg, Ca, Ba, Sr, Al, Zr, Hf and Ce. In general, all these may be used in aqueous (or alcoholic-aqueous) 1–10% metal oxide content solutions at temperatures within the range of 400–1200° F.

In general, it will be seen that the anion employed (whether or not it contains the metal atom) must be thermally unstable at operating conditions, and whichever ion (anion or cation) which does not contain the metal atom must be thermally unstable at operating conditions. Primarily, the metal compound is clearly unstable at the spraying operating conditions. Also, the metal component or ionic portion of the compound, before and after decomposition must be substantially unsolvated, i.e., the solvated form either does not exist or it is thermally unstable at the operating temperatures. Also, the linkage or bond between the cation and the anion is, of course, unstable so as to permit decomposition. The unique porosity of the instant coatings coupled with their ability to adhere to almost any surface is of particular advantage.

The instant crypto-crystalline metal oxide coatings may be applied to a suitable catalyst carrier surface so as to function as the catalyst per se; or the instant crypto-crystalline coatings may be applied to a catalyst carrier which already has a surface catalyst thereon, so as to protect the surface catalyst from erosion or attrition during carrying out of the catalyzed reaction. In addition, the instant crypto-crystalline coatings may be applied to carrier members such as glass beads, which heretofore could not be suitably employed with a number of catalysts, because of lack of adherence. In still another type of function, the instant crypto-crystalline layer may be applied to glass beads, exactly as described in connection with the application of alumina, and such crypto-crystalline alumina coating may then be impregnated with a suitable catalyst. For example, the alumina coated Pyrex beads hereinbefore described, using 80 grams thereof, were mixed with 20 grams of nickel nitrate

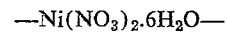
—Ni(NO$_3$)$_2$·6H$_2$O— and the mixture was heated and agitated until the nitrate had been completely decomposed and converted to black nickel oxide, leaving a film of black nickel oxide which impregnated the alumina layer. After removal of the loose non-adherent nickel oxide powder, the beads weighed 81.1 grams. Using 50 ccs. of the coated beads, at a flow rate of 91 ccs. of gaseous ammonia per minute and a temperature of 460° C., a decomposition of 17.5% was noted. Prior to use, the nickel oxide on the beads was reduced by a slow stream of ammonia gas at 460° C.

As will be explained hereinafter, still another aspect of the instant invention resides in the reducing reaction with respect to a crypto-crystalline metal oxide coating, whereby the crypto-crystalline metal oxide coating is subjected to a gaseous reducing atmosphere and an elevated temperature, if necessary, so as to reduce the metal oxide to the metal. This reaction may be accomplished with oxides of metals having a greater E.M.F. than Mn in the electromotive force series of metals. Those oxides of metals having an E.M.F. of Mn or less (e.g., Mn, Al, Mg, Ba, Sr, Ca, etc.) are not readily reduced to the metal in a gaseous reducing atmosphere; whereas the oxides of metals having E.M.F.'s greater than Mn, (e.g. Zn, Cr, Cd, Fe, Co, Sn, Pb, Cu, Bi, Sb, etc.) may be reduced to the metal in a gaseous atmosphere. The noble metals (e.g. Ag, Au and Pt) and Hg may be reduced from the oxide to the metal merely by heating in ordinary atmosphere; and as will be explained the noble metal compounds deposit the noble metal per se in the instant invention. The "gas-reducible" crypto-crystalline metal oxides may thus be classified as oxides of metals having an E.M.F. (volts) with the range of about $-1.0$ volt (Mn having $-1.075$ volts) to about $+0.7$ volt (Hg having $+0.748$ volt).

The reduction of the nickel oxide which impregnated the alumina coated glass spheres, just demonstrated, thus shows an embodiment of the invention wherein a base coating of "not gas-reducible" crypto-crystalline metal oxide is employed with a "gas-reducible" metal oxide impregnant. The impregnant used may, of course, also be a crypto-crystalline metal oxide sprayed on as a coating over the crypto-crystalline alumina coating, for example, using a 4% magnesia content magnesium nitrate aqueous solution sprayed at 1000° F., whereby a plural layer crypto-crystalline coating is obtained containing two metal oxides which are not gas-reducible. In contrast, a nickel oxide coating may be applied to the alumina coated glass beads by spraying a 4% nickel oxide content aqueous nickel nitrate solution at 600° F. onto the alumina coated spheres, so as to deposit crypto-crystalline nickel oxide thereon. The crypto-crystalline nickel oxide may then be reduced by exposure to a gaseous reducing atmosphere such as ammonia at 460° C. The crypto-crystalline nickel oxide coating may, likewise, be applied directly to the glass spheres, in the absence of the alumina coating; but it will be noted that the nickel particulate catalyst in layer form (resulting from the reduction of crypto-crystalline nickel oxide) heretofore could not be applied to a catalyst carrier such as glass beads. In still another aspect of the instant invention, the crypto-crystalline nickel oxide coating may be applied first to the beads and this step is then followed by the application of a crypto-crystalline alumina coating (by the procedures just described); and then the plural coated glass beads are again exposed to ammonia at 460° C., so as to reduce the nickel oxide to nickel. In this instance, a nickel oxide layer, subsequently reduced to nickel, is provided with a protective abrasion resistant alumina coating. The spheres thus coated may be stacked in a suitable catalyst bed and loss of nickel particles from the surface of the spheres is substantially minimized by the presence of the protective alumina coating which protects against attrition or gas erosion losses. Such a procedure substantially eliminates the necessity for collecting and reprocessing "catalyst fines."

It will thus be seen that an important aspect of the invention resides in the provision of a protective crypto-crystalline coating for a catalyst (as well as the provision of a crypto-crystalline catalyst coating). Particularly, in the case of expensive catalyst materials, the instant invention provides unusual advantages. For example, it provides for the application of the catalyst material in an extremely thin, but high surface area film at a minimum expense in materials consumed. In addition, the instant invention provides for the application of an adherent porous crypto-crystalline layer of a less expensive metal oxide over a surface catalyst, so as to protect the surface catalyst (which may be an expensive material) from loss through attrition and gas erosion. This aspect of the invention is particularly advantageous in the case of catalysts such as platinum, rhodium, palladium, osmium, ruthenium, lanthanum, etc.

Another aspect of the instant invention resides in the provision for the application of oxides of the metals of group VIII of the periodic system, which in turn may be reduced to the metal by a subsequent reduction step in a gaseous reducing atmosphere. These metals are in many cases relatively expensive and they are all recognized as metals that are used to catalyze a number of different reactions and metals which are particularly suitable for this purpose. These metals may be deposited upon a suitable carrier as crypto-crystalline metal-metal oxide layers (i.e. layers which contain both the metal and the metal oxide) using the procedure hereinbefore outlined with, for example, a 4% metal oxide content of an aqueous nitrate salt of Fe, Co, Ni, Ru, Rh, Pd, Os and/or Ir, using a spraying temperature of about 600° F. The ease with which such crypto-crystalline metal-metal oxide coatings may be reduced in an atmosphere such as ammonia at an elevated temperature clearly indicates the very substantial area and the extremely small particle size of the materials in the coating. The nature of the metal-metal oxide coatings thus obtained will be discussed in further detail in connection with noble metal deposition.

Another aspect of the invention resides in the heating of the coatings to the extent necessary to stabilize the X-ray diffraction pattern. This improves the catalytic activity by imparting additional uniformity to the crystal structure here involved. To accomplish this, only heating to a crystal growth inducing temperature (e.g. 1000° F.) for a slight period of time is required, the desired result being easily ascertained by experiment.

Still another aspect of the instant invention resides in the application of a crypto-crystalline noble metal coating. As used herein, the term noble metal means a metal which is released from its decomposable salt under the operating conditions to form the metal more predominately than the metal oxide. Actually, the metallic state of such a metal is more stable than the metal oxide state under the spraying conditions. Ordinarily, a metal-metal oxide mixture is obtained because the reaction is so fast that a complete equilibrium cannot be reached. The "noble metals" (as used herein) under the instant reaction conditions include Au, Ag, Ta and the six highest atomic weight metals of group VIII (Ru, Rh, Pd, Os, Ir and Pt). In the case of Ag, Ru and Pd the tendency is to deposit an appreciable amount of oxide with the metal; whereas only minor or trace amounts of oxides are usually deposited with the other noble metals. As hereinbefore mentioned, the noble metals tend to deoxidize at slightly elevated temperatures in ordinary atmosphere. The more stable form of these metals is in the metal per se rather than the oxide. These metals have an E.M.F. of at least about 0.771 volt (which is the E.M.F. of silver). Otherwise, the deposition of the coating of crypto-crystalline character from the solution of the noble metal compound is the same. In other words, a high surface area crypto-crystalline noble metal coating (containing minor amounts of metal oxide) may be obtained by spraying a solution in a volatile solvent of a noble metal compound that is thermally decomposable to yield the metal against the surface hot enough to thermally decompose the compound and release discrete metal particles which contact and adhere to the surface as a coating layer (the heat of the surface also effectively volatilizing the remaining components).

For example, glass slides heated at 700° F., 800° F. and 900° F. were sprayed with the 10% aqueous silver nitrate solution in order to form a brownish crypto-crystalline coating thereon. Similar coatings were also obtained using a 5% solution. Careful examination of these coatings revealed that they appear to contain a mixture of silver oxide and metallic silver. Reduction of all the silver oxide to metallic silver in a gaseous reducing atmosphere is, however, a particularly simple operation, in view of the relatively high E.M.F. of silver. In the case of platinum compounds, however, it appears that the platinum coating obtained is substantially all pure platinum. For example, a crypto-crystalline platinum coating was applied in accordance with the teachings of the instant invention using a 10% chloroplatinic acid solution at 900–1100° F. The deposition of platinum from this aqueous-acid solution produces a very thin platinum film which has good electrical conductivity. In view of the relatively small amount of platinum employed in obtaining a platinum film, as well as the relatively small amount of silver or gold which need be required in carrying out the instant invention, there is a potential use for these coatings in "printed circuits." A less expensive procedure in this connection involves using a 4% copper oxide content aqueous copper nitrate solution at 600° F., spraying the solution through a mask onto a dielectric surface to define a printed circuit, followed by reduction of the copper oxide to copper in the presence of a suitable gaseous reducing atmosphere. The instant noble metal crypto-crystalline deposits are, however, particularly useful from a practical point of view in catalysis, because the instant procedure permits the use of a minimum amount of material in producing a coating having a maximum surface area. In addition, the instant invention provides for the application of a suitable protective crypto-crystalline coating over an expensive noble metal coating, using, for example, a 4% zirconia content ammonium zirconyl carbonate aqueous solution at 400–600° F.; a 4% chromia content aqueous chromium nitrate solution at 600° F.; or a 4% chromia content ammonium chromate aqueous solution at 600° F.

Still another aspect of the instant invention resides in the use of the crypto-crystalline protective coating over a suitable film catalyst so as to prevent one type of "poisoning" of the catalyst. As is well known, poisoning of catalysts may occur by the "covering" of the catalyst active surface area by large particles, which prevent contact with the active surface. In view of the continuous porosity provided by the instant crypto-crystalline coatings, any large particle which may come in contact with a certain amount of surface area of a protective crypto-crystalline coating will not engage the surface of the catalyst film which the crypto-crystalline protective coating covers and will thus not effectively poison this catalyst. This porosity also serves still another function in the case of certain metal oxide catalysts which tend to vaporize at higher temperatures. Examples of these catalysts include molybdic oxide and aluminum chloride (or any other Friedel-Crafts catalyst). For example, a zirconia coating applied to a molybdic oxide catalyst has such fine porosity that the volatilized molybdic oxide molecule cannot pass through the pores. In this way, the protective zirconia coating effectively retains the molybdic oxide molecule on location as a catalyst, preventing its escape by volatilization, and thus permitting higher operating temperatures using molybdic oxide as a catalyst.

Other examples of catalysts which may be prepared in accordance with the teachings of the instant invention include:

(1) Using a commercially available 60% nickel–40% kieselguhr catalyst, frequently used for olefin bond hydrogenation, coated with a crypto-crystalline alumina or a crypto-crystalline magnesia coating by the procedure hereinbefore described. A silica coating deposited from a 4% silica content very slightly alkaline solution of a silica sol (e.g., $Na_2O.9SiO$), using a spraying temperature of 1000–1200° F. also provides an effective protective coating.

(2) A copper chromate hydrogenation catalyst, frequently used to hydrogenate carbon-oxygen double bonds, is provided with a protective inert coating of alumina, silica or magnesia as described above. Also, a protective nickel oxide coating may be applied, and this will be followed by reduction, so as to provide a two-function hydrogenation catalyst.

(3) As a dehydrogenation catalyst, molybdenum oxide (5–10%) on alumina may be used, with a suitable crypto-crystalline protective coating thereon of zirconia, titania, chromia, silica or the like. As previously mentioned, the fine porosity of these crypto-crystalline coatings prevents the escape of the molybdenum oxide molecule at elevated temperatures under oxidizing conditions.

(4) An example of a catalytic cracking catalyst is the synthetic 87% silica–13% alumina microsphere gel catalyst, which is coated with alumina, silica, magnesia, zirconia or the like so as to prevent this catalyst from losses by attrition and also to prevent poisoning of this catalyst by larger molecules which would otherwise be exposed to the silica-alumina catalyst core.

(5) An example of an oxidation catalyst is 10% vanadium oxide on an alpha alumina carrier. This catalyst is also coated with a layer of alumina, zirconia, silica or the like in accordance with the practice of the instant invention in order to prevent erosion losses. The catalyst is used for oxidation of naphthalene to phthalic anhydride.

(6) An example of another oxidation catalyst is 10% vanadium oxide, 57% silica and 33% potassium sulfate, which has been coated with the surface layer of crypto-crystalline alumina, silica, zirconia, or the like to minimize attrition losses (particularly when the catalyst is used in a fluidized bed).

(7) An isomerization catalyst comprising 10 weight percent of aluminum chloride on a bauxite carrier is also coated with a crypto-crystalline alumina, silica, titania, zirconia or the like coating, which coating tends to minimize losses by volatilization of the aluminium chloride.

(8) A cobalt catalyst may be obtained by spraying a 4% cobalt oxide content aqueous cobalt nitrate solution onto glass spheres heated at 600° F., followed by reduction to the cobalt metal using ammonia at 460° C.

Still another aspect of the invention resides in the fact that the noble metals deposited as a metal, whereas metals which are more stable in the oxide form are deposited as the oxide in the practice of the instant invention. This permits the purification of a noble metal which may contain another metal as an impurity. A typical example of this is in the case of platinum which is ordinarily available commercially with at least an appreciable amount of palladium (a more readily oxidizable noble metal) therein as an impurity. In the practice of the instant invention, separation of those two metals may be obtained by a procedure which comprises first preparing a solution in a volatile solvent of a palladium-containing platinum compound (such as the chloroplatinic acid solution hereinbefore described) that is thermally decomposable, atomizing the solution, maintaining a surface at a temperature sufficient to decompose the compound and effect substantially complete vaporization of the volatile components resulting, directing the atomized solution against the surface at a rate sufficient to effect thermal decomposition of the compound, vaporization of the volatile components and impinging of discrete palladium oxide and platinum particles against the surface and adherence of the particles thereto and then recovering palladium-free platinum by dissolving the platinum with acid (cold dilute hydrochloric acid) and leaving the palladium oxide on the surface. Apparently the palladium is sufficiently more oxidizable under the spraying conditions, particularly with additional oxygen present from, for example, a decomposing nitrate anion, that the small amount of oxide deposited is substantially all palladium oxide. A unique feature of the instant invention, clearly indicating the immense surface area afforded by these coatings, is that the platinum so deposited has been found to be readily soluble in an acid such as hydrochloric acid. Because of this characteristic of the platinum coating, the platinum may be dissolved out of the palladium oxide and a palladium-free platinum is thus obtained.

Actually, the behavior of certain of the "less noble" metals such as Ag, Ru and Pd may be controlled to an appreciable extent with the spraying atmosphere. In an atmosphere at least as strong as that of air (or slightly more so because of the decomposition of an oxygen releasing anion such as nitrate), there is a tendency to produce substantial quantities of the oxide; whereas almost a pure metal can be obtained in a reducing atmosphere of hydrogen (or that produced by the decomposition of an organic acid anion, for example).

It so happens that palladium oxide is a catalyst for the conversion of carbon-monoxide to carbon-dioxide; but because of the relatively great expense involved in using this material for this purpose, its use has heretofore been very limited. The present invention provides for the application of an extremely thin coating of palladium oxide to a suitable catalyst carrier surface, so that the palladium oxide may be used, for example, in tail pipes of automobiles to effect this conversion of carbon-monoxide to carbon-dioxide. In addition, because of the various number of materials in automobile exhaust which might tend to poison a catalyst, the instant invention provides still an additional feature in that a palladium oxide deposit may be covered with a protective crypto-crystalline zirconia or a similar refractory coating to prevent poisoning or fouling of the palladium oxide catalyst.

It will be understood that modifications and variations may be effected without departing from the scope of the novel concepts of the present invention.

We claim as our invention:

A method of preparing a high surface area metal coating, which comprises applying an adherent thin crypto-crystalline coating of an oxide of the metal to a catalyst carrier and then exposing the coating to a gaseous reducing atmosphere to reduce the metal oxide to the metal.

References Cited in the file of this patent

UNITED STATES PATENTS

| | | |
|---|---|---|
| 237,963 | Craig | Feb. 22, 1881 |
| 2,088,070 | Spencer | July 27, 1937 |
| 2,330,664 | Bennett | Sept. 28, 1943 |
| 2,459,907 | Winslow et al. | Jan. 25, 1949 |
| 2,570,245 | Jung | Oct. 9, 1951 |
| 2,628,888 | Benson | Feb. 17, 1953 |
| 2,698,812 | Schloditz | Jan. 4, 1955 |

OTHER REFERENCES

Mellow: (Comprehensive Treatise on Inorganic and Theoretical Chemistry, vol. 15), published May 1936, page 4.